US012049052B2

(12) United States Patent
Moon et al.

(10) Patent No.: US 12,049,052 B2
(45) Date of Patent: Jul. 30, 2024

(54) POLYMERIC MATERIAL HAVING MICRO-NANO COMPOSITE STRUCTURE, DEVICE INCLUDING THE SAME, AND METHOD OF MANUFACTURING THE POLYMERIC MATERIAL

(71) Applicant: KOREA INSTITUTE OF SCIENCE AND TECHNOLOGY, Seoul (KR)

(72) Inventors: Myoung-Woon Moon, Seoul (KR); Young A Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 561 days.

(21) Appl. No.: 16/842,841

(22) Filed: Apr. 8, 2020

(65) Prior Publication Data

US 2020/0316881 A1    Oct. 8, 2020

(30) Foreign Application Priority Data

Apr. 8, 2019 (KR) .......................... 10-2019-0041056

(51) Int. Cl.
*B29C 71/04* (2006.01)
*B29K 105/16* (2006.01)
(Continued)

(52) U.S. Cl.
CPC .......... *B29C 71/04* (2013.01); *B29K 2105/16* (2013.01); *B29K 2995/0092* (2013.01);
(Continued)

(58) Field of Classification Search
CPC ...... B29C 2059/145; Y10T 428/24479; B29K 2105/16; B29K 2995/0092; B29L 2007/008; B29L 2031/731
(Continued)

(56) References Cited

U.S. PATENT DOCUMENTS 4,254,182 A * 3/1981 Yamaguchi ............ D01D 5/247
264/344
5,725,954 A * 3/1998 Montsinger ........... B29B 15/122
428/397
(Continued)

FOREIGN PATENT DOCUMENTS

KR    1020150108287 A    9/2015

OTHER PUBLICATIONS

Cebeci et al., "Nanoporosity-Driven Superhydrophilicity: A Means to Create Multifunctional Antifogging Coatings," Langmuir, 2006, pp. 2856-2862, vol. 22, No. 6, American Chemical Society.
Peter Sigmund, "A mechanism of surface micro-roughening by ion bombardment," Journal of Materials Science, 1973, pp. 1545-1553, Chapman and Hall Ltd.
R. K. Roy et al., "Surface energy of the plasma treated Si incorporated diamond-like carbon films," Diamond and Related Materials, ScienceDirect, 2007, pp. 1732-1738, vol. 16 , Elsevier B.V.
(Continued)

*Primary Examiner* — Megha M Gaitonde
(74) *Attorney, Agent, or Firm* — CANTOR COLBURN LLP

(57) ABSTRACT

Provided is a polymeric material having a micro-nano composite structure, a device including the same, and a method of manufacturing the polymeric material. The polymeric material includes a polymer fiber or film, wherein the polymer fiber or film has, on a surface thereof, a micro-nano composite structure including a microstructure containing concavo-convex grooves having a microscale semi-cylindrical shape ("◡") and a nanopattern containing nanoscale protrusions formed on a surface of the microstructure. The polymeric material has excellent absorbency and hydrophilic or super-hydrophilic surface properties, and also has oleophobic or super-oleophilic properties in water, and thus may be effectively applied to fields such as oil-water separation, purification, and filters. The polymeric material may be readily manufactured through an environmentally friendly, large-area atmospheric pressure plasma process.

18 Claims, 17 Drawing Sheets

(51) Int. Cl.
  *B29L 7/00* (2006.01)
  *B29L 31/00* (2006.01)
(52) U.S. Cl.
  CPC ... *B29L 2007/008* (2013.01); *B29L 2031/731* (2013.01); *Y10T 428/24479* (2015.01)
(58) Field of Classification Search
  USPC .................. 428/141, 156, 167, 212, 213
  See application file for complete search history.

(56) References Cited

U.S. PATENT DOCUMENTS

| | | | | |
|---|---|---|---|---|
| 6,045,911 | A * | 4/2000 | Legrand | A01D 34/4168 |
| | | | | 428/399 |
| 2012/0051489 | A1 * | 3/2012 | Varanasi | F28F 13/182 |
| | | | | 165/185 |
| 2015/0258588 | A1 | 9/2015 | Moon et al. | |
| 2017/0014111 | A1 * | 1/2017 | Hulseman | A61B 17/00 |

OTHER PUBLICATIONS

Chi-Wai Kan et al: "Atmospheric Pressure Plasma Surface Treatment of Rayon Flock Synthetic Leather with Tetramethylsilane", Applied Sciences, Feb. 22, 2016, 15 pages, vol. 6, No. 2.

Juan P. Fernandez-Blazquez et al. "Superhydrophilic and superhydrophobic nanostructured surfaces via plasma treatment", Journal of Colloid and Interface Science, Jan. 26, 2011, pp. 234-238, vol. 357, No. 1.

Lidija Fras Zemljic et al: "Improvement of Chitosan Adsorption onto Cellulosic Fabrics by Plasma Treatment", Biomacromolecules, May 11, 2009, pp. 1181-1187, vol. 10, No. 5, American Chemical Society.

Won-Kyu Lee et al: "Controlled Three-Dimensional Hierarchical Structuring by Memory-Based, Sequential Wrinkling", Nano Letters, Jul. 28, 2015, pp. 5624-5629, vol. 15, No. 8, American Chemical Society.

The extended European Serach Report for EP Application No. 20168420.6 mailed on Aug. 26, 2020.

* cited by examiner (a) BEFORE ATMOSPHERIC PRESSURE PLASMA TREATMENT (b) AFTER ATMOSPHERIC PRESSURE PLASMA TREATMENT

POLYMERIC MATERIAL HAVING MICRO-NANO COMPOSITE STRUCTURE, DEVICE INCLUDING THE SAME, AND METHOD OF MANUFACTURING THE POLYMERIC MATERIAL

CROSS-REFERENCE TO RELATED APPLICATION

This application claims the benefit of Korean Patent Application No. 10-2019-0041056, filed on Apr. 8, 2019, in the Korean Intellectual Property Office, the disclosure of which is incorporated herein in its entirety by reference.

BACKGROUND

1. Field

One or more embodiments relate to a polymeric material having a micro-nano composite structure, a device including the same, and a method of manufacturing the polymeric material.

2. Description of Related Art

Polymer films or fibers such as cellulose that are currently used have pores of hundreds of millimeters, but do not have a high surface roughness at the level of a few micrometers or nanometers. Since such polymeric material has little roughness at a size of tens or hundreds of nanometers, improving the functionality of the polymer surface is being significantly emphasized in order to use the polymeric material for water harvesting, anti-fogging, anti-bacterial purposes, or cell growth, and thus there are cases in which a functional coating or nano/micro structure is formed to improve surface functionality. In general, it is known that when such polymeric material is applied to an oil-water separator that may be utilized in oil recovery, water treatment, etc., there are limitations in durability or performance. In particular, in order to separate high-viscosity materials such as bunker C oil or crude oil that are frequently leaked into the ocean, a polymeric material having improved in terms of oil-water separation functionality and high water absorption needs to be developed. Besides, since oil repellency is not kept high for high-viscosity oils, a special surface structuring technique for high-viscosity oil-water separation is required.

A technique for removing oil from oil-spilled rivers or oceans involves separating and removing spilled oil or liquid by controlling the hydrophilicity or hydrophobicity, the lipophilicity or oil repellency of a surface, and the surface energy corresponding to counterpart fluids. Techniques for separating oil and water (hereinafter, oil-water separation techniques) may be mainly classified into two types, one of them involving using a superhydrophobic filter having low surface energy to let oil flow out but prevent water from flowing out, and the other involving using a hydrophilic or superhydrophilic filter having high surface energy to let water flow out but prevent oil from flowing out due to a water film formed between the filters. To separate oil from water, it is more useful to use a filter using the latter technique, which has recently gained growing attention, and in this regard, a technique for hydrophilizing the filter is required.

Studies are being continuously conducted in order to use a hydrophilic surface or a super-hydrophilic surface having good affinity with pure water on the surface of a material for water harvesting, anti-fogging, anti-bacterial purposes, or cell growth, or to enhance bonding properties with other materials by modifying the properties of a material surface.

As a method of forming a hydrophilic or super-hydrophilic surface on the surface of a material, wet etching, UV treatment, plasma/ion treatment, etc. are used. In particular, it is known that a hydrophilic or super-hydrophilic surface may be obtained when increasing the surface roughness and controlling the chemical properties of the surface using a hydrophilic material.

It is known that a polymer surface treated with oxygen or nitrogen vacuum plasma, etc. has increased hydrophilicity immediately after plasma treatment, but is thermodynamically unstable to return to hydrophobicity, which is the inherent property of a polymer, thereby causing an aging effect. [Roy et al, Diamond and Related Materials, 16 (2007), 1732-1738]

Recently developed methods of forming a super-hydrophilic surface include a method of depositing $TiO_2$ coating to develop a material having a large number of nanoscale pores, and a method of mixing nanoscale particles such as $TiO_2$ particles and $SiO_2$ particles at an appropriate ratio to form a hydrophilic surface. [FC Cebeci, Langmuir 22 (2006), 2856]. However, the surface material prepared by these methods has a disadvantage in that it is not available for a large area or mass production, and there is also a limitation in adhesion between a coating material and a base material. However, as industries become more sophisticated, environmental issues become more prominent, and research into materials for separating and/or removing specific substances from mixtures, such as oil-water separation and seawater desalination, are continuously increasing. In addition, oil-water separation methods are being highlighted as easy ways of preventing secondary environmental pollution in the event of an oil spill, which is a recently emerging issue.

In this sense, there is a demand for a method in which a treatment process is environmentally friendly, having improved durability as compared to any other surface treatment methods, and using a simpler process to manufacture a surface structure over a large area under normal pressure without using vacuum equipment.

SUMMARY

One or more embodiments include a polymeric material having excellent absorbency and a surface with improved hydrophilicity and oil repellency in water.

One or more embodiments include a device adopting the polymeric material.

One or more embodiments include a method of manufacturing the polymeric material through a simple, environmentally friendly process.

Additional aspects will be set forth in part in the description which follows and, in part, will be apparent from the description, or may be learned by practice of the presented embodiments of the disclosure.

According to one or more embodiments,
a polymeric material includes a polymer fiber or film
wherein the polymer fiber or film has, on a surface thereof, a micro-nano composite structure including a microstructure containing concavo-convex grooves having a microscale semi-cylindrical shape ("﹀︺") and a nanoscale nanopattern formed on a surface of the microstructure.

According to one or more embodiments, a device includes the polymeric material

According to one or more embodiments, a method of manufacturing the polymeric material includes performing, without a mask, atmospheric pressure plasma treatment on a surface of a polymeric material including a polymer fiber or film having concavo-convex grooves along the longitudinal direction thereof.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6A is a graph showing Sigmund's sputter morphology evolution model, FIG. 6B is a graph showing the energy release of a surface subjected to ion irradiation, and FIG. 6C is a schematic view explaining the difference in plasma etching rate between amorphous and crystalline regions of a polymer fiber;

FIG. 12A is a sample image before treatment. FIG. 12B is a surface image after 10 cycles of plasma treatment, and FIG. 12C is a surface image after 50 cycles of plasma treatment;

DETAILED DESCRIPTION

Figure 1:
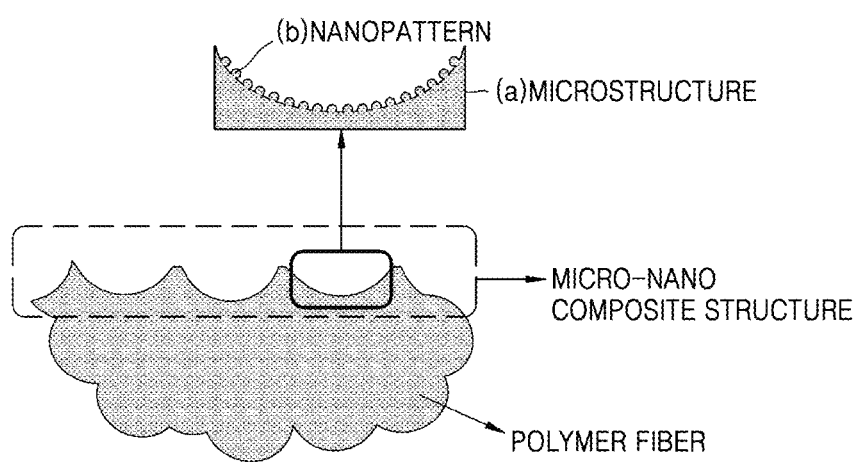
FIG. 1 is a schematic cross-sectional view of a polymer fiber constituting a polymeric material according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The present inventive concept described below may be modified in various forms and have many embodiments, and particular embodiments are illustrated in the drawings and described in detail in the detailed description. However, the present inventive concept should not be construed as limited to the particular embodiments, but should be understood to cover all modifications, equivalents or replacements included in the technical scope of the present inventive concept.

The terminology used herein is for the purpose of explaining particular embodiments only and is not intended to limit the present inventive concept The singular forms include the plural forms as well, unless the context clearly indicates otherwise. It will be further understood that the terms "comprise" or "comprising" when used herein, specify the presence of stated features, numbers, steps, operations, elements, parts, components, materials, or combinations thereof, but do not preclude the presence or addition of one or more other features, numbers, steps, operations, elements, parts, components, materials, or combinations thereof.

In the drawings, the thicknesses of layers and regions are enlarged or reduced for clear explanation. The same reference numerals are marked for similar elements throughout. When a layer, film, region, plate, or the like is referred to as being "on" another part, it can be directly on the other part, or intervening parts may be present. The terms "first", "second", and the like may be used for describing various elements throughout, but the elements are not limited by the terms. The terms are used to only distinguish one element from other elements.

It will be understood that terms "the first" and "the second" may be used for describing various elements, components, areas, layers and/or regions, but such elements, components, areas, layers and/or regions should not be construed as limited to such terms.

In addition, it is not deemed that processes described in the disclosure should be conducted in order. For example, terms such as a first step and a second step do not mean that the first step should be conducted before the second step Hereinafter, a polymeric material having a micro-nano composite structure according to an embodiment, a device including the same, and a method of manufacturing the polymeric material will be described in detail with reference to the accompanying drawings.

A polymeric material according to an embodiment includes a polymer fiber or film, wherein the polymer fiber or film has, on a surface thereof, a micro-nano composite structure including a microstructure containing concavo-convex grooves having a microscale semi-cylindrical shape ("⌣") and a nanopattern containing nanoscale protrusions formed on a surface of the microstructure.

FIG. 1 is a schematic cross-sectional view of a polymer fiber constituting a polymeric material according to an embodiment.

As shown in FIG. 1, the polymeric material includes a micro-nano composite structure on a surface of the polymer fiber. Since the micro-nano composite structure may be formed using, for example, an atmospheric pressure plasma etching process, the micro-nano composite structure may be formed in one direction, exposed to plasma, of the polymer fiber surface.

The micro-nano composite structure includes a microstructure having concavo-convex grooves negatively etched in a microscale semi-cylindrical shape ("⌣") along the longitudinal direction of the polymer fiber and a nanopattern having nanoscale protrusions formed on a surface of the microstructure.

The polymeric material has hydrophilic or super-hydrophilic surface properties and oleophobic or super-oleophilic properties in water due to such a micro-nano composite structure, and may thus be effectively applied to fields such as oil-water separation, purification, and filters.

Figure 2:
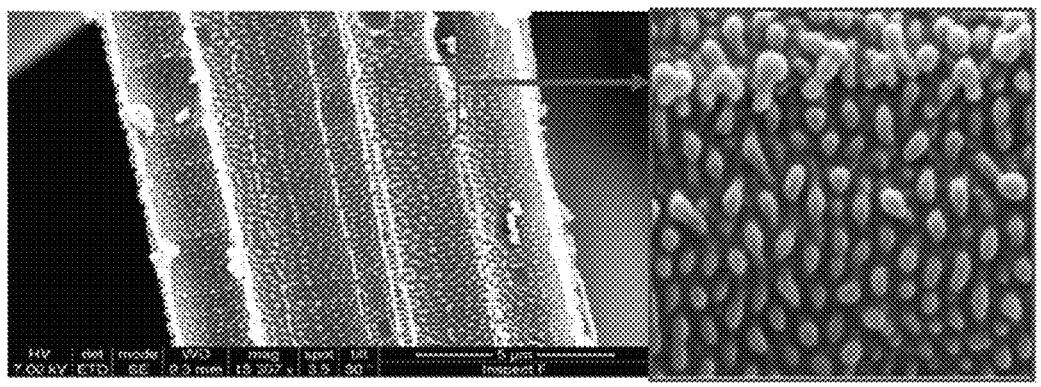
FIG. 2 is a scanning electron microscope (SEM) image showing a micro-nano composite structure formed on a surface of a polymer fiber of a polymeric material subjected to atmospheric pressure plasma treatment in an embodiment.

FIG. 2 is a scanning electron microscope (SEM) image of a micro-nano composite structure formed on a surface of a polymer fiber of a polymeric material according to an embodiment. As shown in FIG. 2, concavo-convex grooves etched in a microscale semi-cylindrical shape along the longitudinal direction of the polymer fiber is formed on the surface of the polymer fiber, and an enlarged SEM image of a portion of the concavo-convex groove line shows that a nanopattern is formed on the surface of the microstructure.

According to an embodiment, the polymeric material having such a micro-nano composite structure may be manufactured through atmospheric pressure plasma treatment without an etching mask. Etching using the atmospheric pressure plasma method is a process of forming plasma under atmospheric pressure, that is, in a normal pressure state (760 Torr) rather than in a vacuum state (generally, 1 m Torr to 100 mTorr), and is known as a cold plasma.

Figure 3:
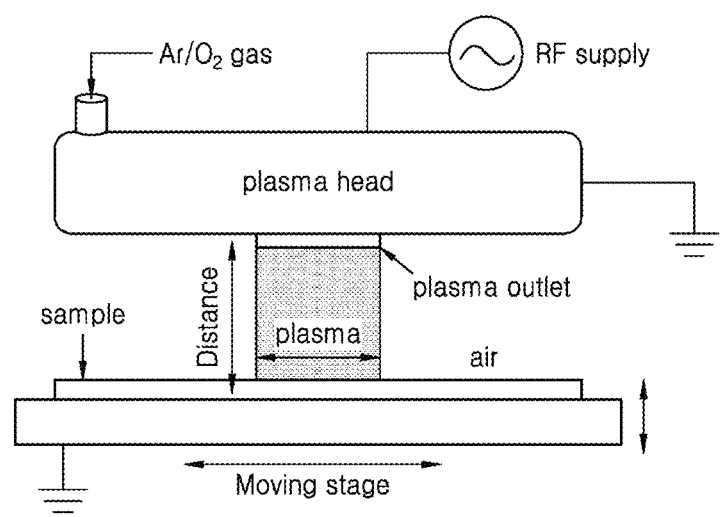
FIG. 3 schematically illustrates an atmospheric pressure plasma device used in a method of manufacturing a polymeric material according to an embodiment.

An example of an atmospheric pressure plasma treatment device that may be used in the manufacturing process is shown in FIG. 3. The atmospheric pressure plasma treatment device may be a device using a dielectric barrier discharge (DBD) method.

As shown in FIG. 3, the atmospheric pressure plasma treatment device is formed of two parallel metal electrodes, and at least one of the electrodes is covered with a dielectric layer. Since the current cannot flow through the electrode in the case of DC power when an insulator is used, AC power is used to generate plasma. The two electrodes are separated at a certain interval to ensure the stable plasma operation. The discharge is ignited by a sinusoidal or pulsed power supply. Depending on the composition, voltage and frequency of the working gas, the discharge is performed in the form of a filament or glow.

According to an embodiment, a polymeric material (sample) to be plasma treated is disposed on the electrode, a distance between a plasma outlet and the polymeric material is set to a range of 1 mm to 10 mm, power of the atmospheric pressure plasma is set to a range of 100 W to 2,000 W, and then the polymeric material is exposed to the atmospheric pressure plasma for 10 to 500 cycles while being moved at a speed of 1 mm/s to 10 mm/s to perform the atmospheric pressure plasma treatment. When treated under the above conditions, the surface of the atmospheric plasma-treated polymer fiber is etched to readily form the above-described micro-nano composite structure.

Figure 4:
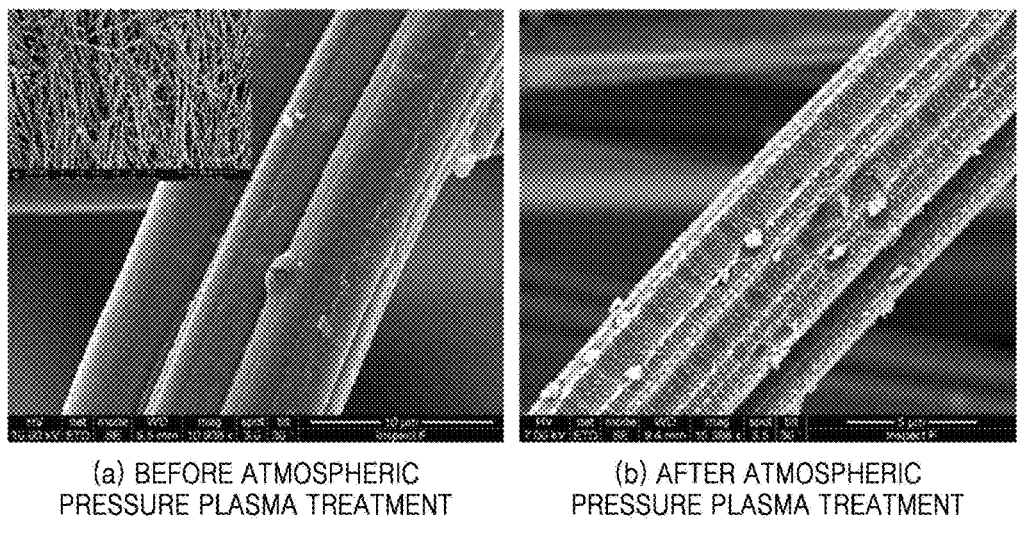
FIG. 4 is a SEM image showing a surface of a polymer fiber before and after atmospheric pressure plasma treatment in Example 1.
Figure 5:
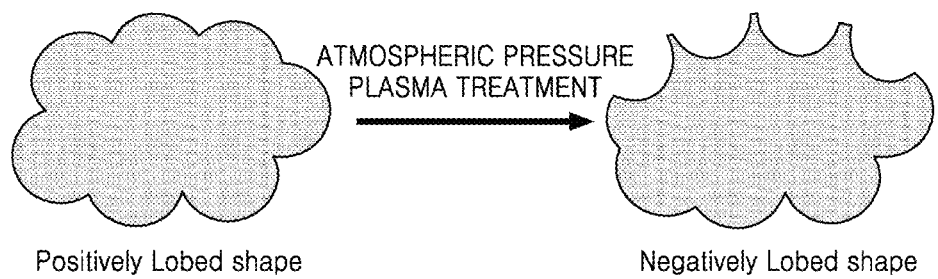
FIG. 5 schematically illustrates a cross section of a polymer fiber before and after atmospheric pressure plasma treatment in Example 1.

FIG. 4 is a SEM image showing a surface of a polymer fiber before and after atmospheric pressure plasma treatment according to an embodiment, FIG. 5 schematically illustrates a cross section of a polymer fiber before and after atmospheric pressure plasma treatment.

As shown in FIGS. 4 and 5, in a polymer fiber having a cross section of a positively lobed shape such as a broadleaf tree, as the surface exposed to the plasma is etched in a microscale semi-cylindrical ("⌣") shape through the atmospheric pressure plasma treatment, concavo-convex grooves may be formed along the longitudinal direction of the fiber. In this case, the polymeric material having a cross section of a positively lobed shape of a broadleaf tree is formed of several bonded micro staple fibers, for example, natural fiber materials such as burlap, ramie, and cotton, or regenerated fibers such as viscose rayon and cellulose acetate. In addition, a nanopattern including nanoscale protrusions is formed on a surface of the concavo-convex grooves.

Ion beam or plasma energy is concentrated at a concave valley portion in an irregular region of the groove present on the surface of the polymer fiber, so that the valley portion may be etched faster than a convex apex portion. Plasma (or ion beam)-induced etching mechanisms for explaining this are shown in FIGS. 6A and 6B.

Figure 6A:
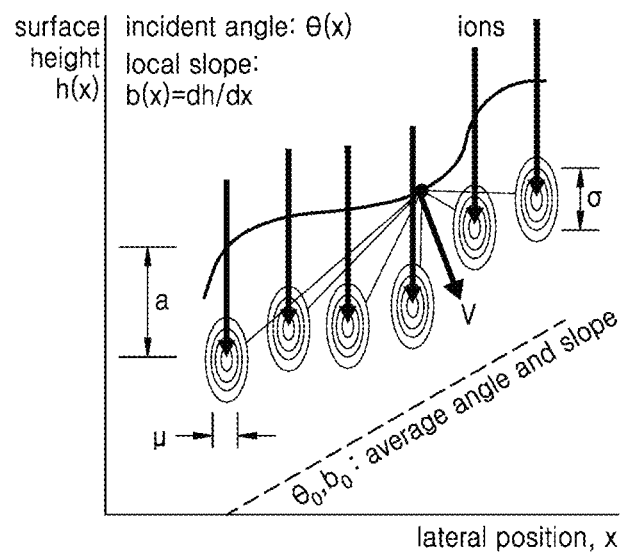
FIGS. 6A to 6C are views for explaining a mechanism of forming a micro-nano composite structure on a surface of a polymer fiber, where

FIG. 6A is a surface morphology evolution model by Sigmund's ion beam sputtering, where equivalent energy contours of incident ions are indicated, an average ion width is a, and the vertical and horizontal scattered contours are $\sigma$ and $\mu$, respectively. As indicated by arrows, the energy from the ions colliding at all points contributes to etching (erosion or sputtering) at point A. The concave portion, such as A, is closer to the maximum value of energy deposition than the convex portion, and thus etching thereof is performed more quickly. [P. Sigmund, A mechanism of surface micro-roughening by ion bombardment, J. Mater. Sci. 8, 1545 (1973)]

Figure 6B:
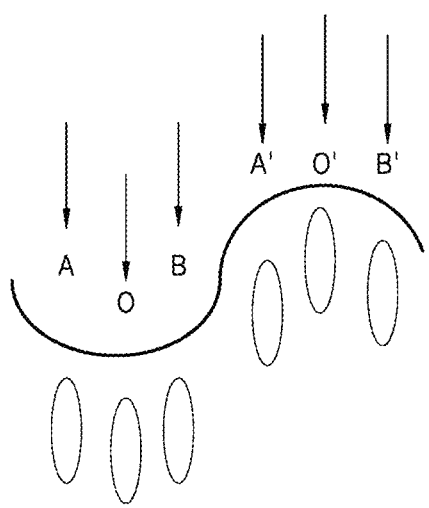

In addition, as shown in FIG. 6B, energy is preferentially emitted from the concave bottom portion of the surface subjected to ion irradiation, so that the etching is performed quickly in the valley portion in an irregular region of the groove present on the surface of the polymer fiber.

Therefore, in the case of using a polymer fiber, having protrusions and recesses along the longitudinal direction, such as regenerated fibers including cellulose acetate or viscose rayon, or natural fibers including cotton, the concave portion is quickly etched to form a micro-nano composite structure as shown in FIG. 4 when atmospheric pressure plasma treatment is performed.

According to an embodiment, the polymer fiber may include a crystalline region and an amorphous region therein. The amorphous region is a region in which hydrocarbon bonds are formed sparsely, and the crystalline region is a region in which hydrocarbon bonds are uniformly distributed. The amorphous region has a significantly faster etching rate than the crystalline region.

Figure 6C:
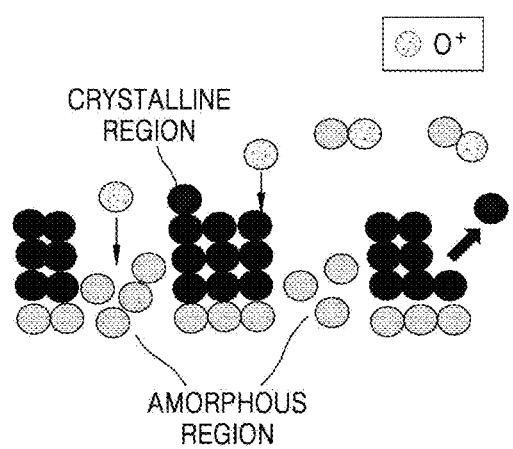

FIG. 6C shows a process of forming nanoscale protrusions. Polymer chains in the amorphous region constituting the polymeric material are loosely distributed and bonded to easily react with plasma ions such as oxygen ($O^+$), so that etching occurs fast; however, in the crystalline region, polymer chains are uniform, even, and densely distributed, so that etching by the reaction with plasma ions occurs slow.

Therefore, when the polymer fiber includes the crystalline region and the amorphous region in the longitudinal direction of the fiber, the amorphous region is etched faster to form a nanoscale pattern. The nano-pattern and the concave micro-pattern of the concavo-convex grooves may be complexly formed to form a micro-nano composite structure pattern.

Figure 7:
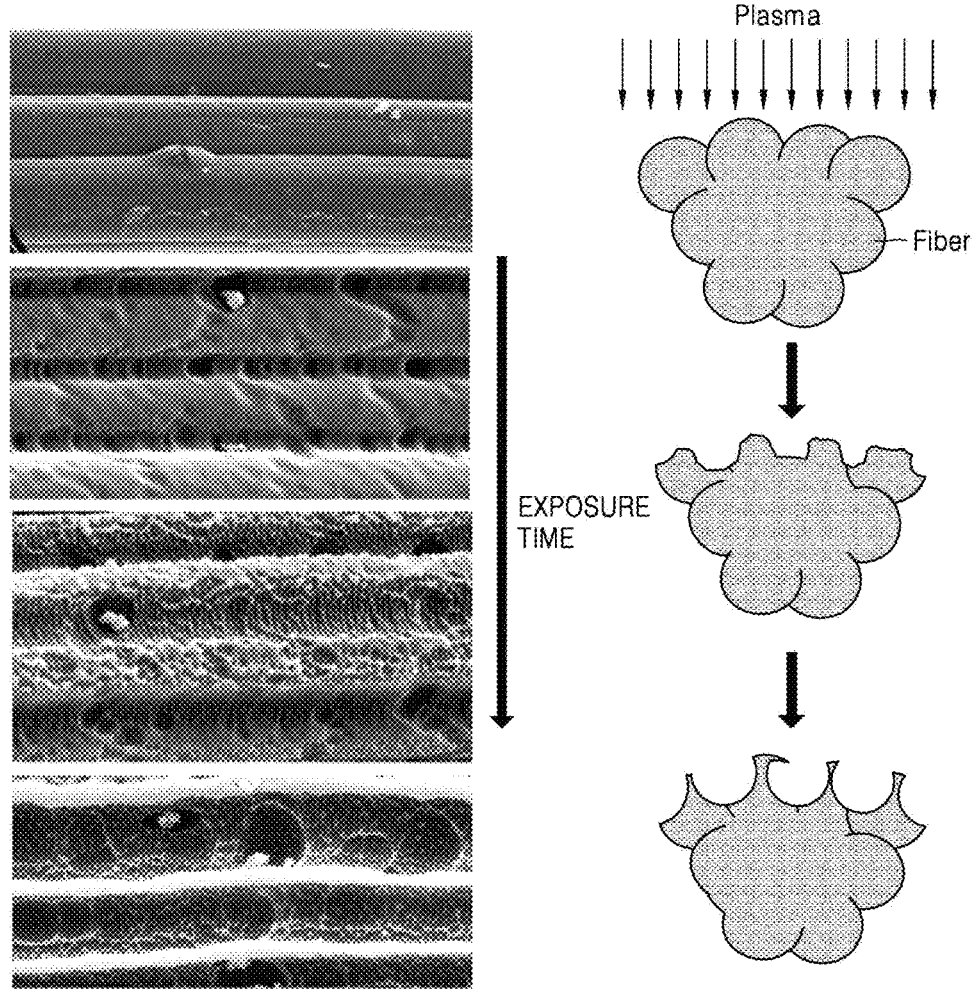
FIG. 7 is a SEM image and a schematic view showing the degree of etching of a polymer fiber according to atmospheric pressure plasma exposure time in Example 1.

FIG. 7 is a SEM image and a schematic view showing the degree of etching of a polymer fiber according to atmospheric pressure plasma exposure time. As shown in FIG. 7, the longer the time exposed to the atmospheric pressure plasma, the greater the surface irregularity of the polymer fiber. Therefore, on the surface of the polymer fiber, a micro-nano composite structure may be formed which includes: a microstructure having concavo-convex grooves etched in a microscale semi-cylindrical shape ("⌣") along the longitudinal direction of the polymer fiber; and a nanopattern having nanoscale protrusions formed on a surface of the microstructure.

According to an embodiment, the concavo-convex grooves may be formed in one direction of the surface of the polymer fiber. When any one direction of the surface of the polymer fiber is exposed to atmospheric pressure plasma, a plurality of concavo-convex grooves may be formed in one exposed direction.

According to an embodiment, the concavo-convex grooves each may have a width d of 1 nm to 1000 nm, and a depth h of 1 nm to 1000 nm. In addition, an aspect ratio (h/d) of the width d to the depth h of the concavo-convex grooves may range from 0.01 to 0.6. In the above range, the polymeric material may have hydrophilic or super-hydrophilic surface properties, and also have oleophobic or super-oleophilic properties in water.

On the surface of the microstructure, a nanopattern including nanoscale protrusions is formed. The nanoscale protrusions may have the form of nano-domes, nano-walls, nano-dots, nano-bumps, nano-hairs, nano-fibers, nano-pillars, nano-rods, nano-wires, nano-wrinkles, nano-flakes, nano-plates, or a combination thereof.

The protrusions each may have a diameter of 1 nm to 1000 nm, a length of 1 nm to 10,000 nm, and an aspect ratio of 1 to 50. In the above range, the polymeric material has hydrophilic or super-hydrophilic surface properties, and also has oleophobic or super-oleophilic properties in water.

According to an embodiment, the polymer fiber or film may include at least one of natural fiber, artificial fiber, and a combination thereof. Examples of the natural fiber may include cellulose, rayon, cotton, silk, hemp, asbestos fibers, combinations thereof, etc. Examples of the synthetic fiber may include i) regenerated fibers such as rayon, modal, tencel, lyocell, and polynosic; ii) semisynthetic fibers such as acetate and triacetate; iii) synthetic fibers such as polyamides including nylon, nomex, Kevlar, etc., polyolefins including polyethylene, polypropylene, etc., polyesters including polyethylene terephthalate, etc., acryl, poly (meth) acrylate, polyvinyl alcohol (PVA), polyurethane, polyvinyl chloride (PVC), polyvinylidene chloride (PVDC), polystyrene, cellulose; inorganic fibers including glass fiber; or copolymers thereof, but are not limited thereto.

According to an embodiment, the polymer fiber or film may include a hydrophilic polymer.

Such hydrophilic polymer may include, for example, at least one selected from the group consisting of cellulose, rayon, cotton, silk, polystyrene (PS), polyethylene terephthalate (PET), polycarbonate (PC), polypropylene (PP), polylactic acid (PLA), polyvinylidene fluoride (PVDF), polytetrafluoroethylene (PTFE), poly(N-isopropylacrylamide) (PNIPAm), poly(2-hydroxyethyl methacrylate) (PHEMA), polyetherimide (PEI), polyvinyl alcohol (PVA), polyethylene (PE), polysilsesquinoxane (PSQ), polyurethane (PU), poly(ethylene glycol) (PEG), poly(methyl methacrylate) (PMMA), and polycaprolactone (PCL).

The hydrophilic polymer has high surface energy and low contact angles. When such hydrophilic polymer is used, a surface of the polymer fiber may have more maximized hydrophilicity after a micro-nano composite structure is formed on the surface of the polymer fiber.

According to an embodiment, the polymeric material may further include a separate second polymer fiber or film formed of the same material as the above-described polymer material and having an outer surface of a wrinkled structure, in addition to the polymer fiber or film having the micro-nano composite structure above.

Figure 15A:
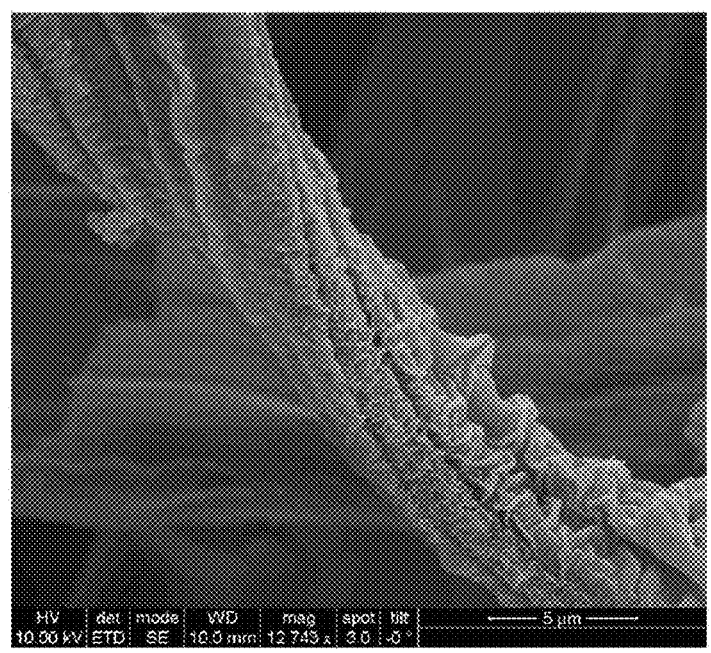
FIGS. 15A and 15B are SEM images showing a wrinkled polymer fiber further included in a polymer fiber according to an embodiment.
Figure 15B:
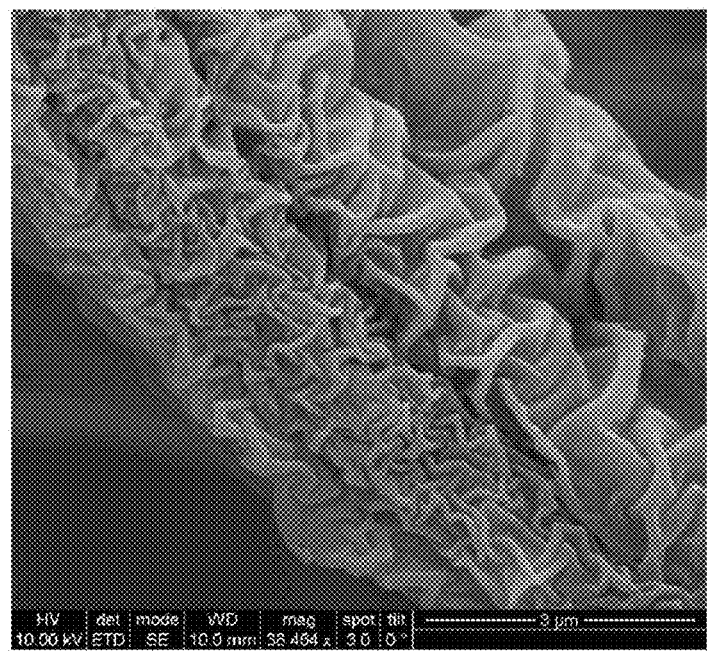

The entire outer surface of the polymer fiber or film may be formed in a wrinkled structure. As shown in FIGS. 15A and 15B, the wrinkled structure may be a hierarchical wrinkled structure having microscale wrinkles and nanoscale wrinkles. The polymer fiber or film having the wrinkled structure may be manufactured as an addition when the polymer fiber or film having the micro-nano composite structure is manufactured. The polymeric fiber or film having the wrinkled structure may be included in an amount of greater than 0% and equal to or less than 50% by weight with respect to the total weight of the polymeric material. In the above range, better hydrophilic properties may be achieved.

According to an embodiment, the polymeric material may further include inorganic particles. The additional inclusion of the inorganic particle may further improve durability of the polymeric material or to allow suitable surface properties according to the use of the polymeric material.

The inorganic particle may be embedded in the polymer fiber or film, or disposed on the surface. The inorganic particle embedded in the polymer fiber or film may serve as an etching inhibitor during plasma etching since the inorganic particle has a relatively slower etching rate than the polymeric material which is an organic material. Accordingly, the shape of a nanopattern may be modified.

Meanwhile, the inorganic particle may be disposed on the surface of the polymer fiber or film, for example, at an end of the nanopattern formed on a micro-nano composite structure, for example, the very end of a nanoscale concavo-convex portion. This may indicate that the inorganic particle disposed on the polymer fiber or film is left after serving as an etching inhibitor.

The inorganic particle may include at least one of metals or metal oxides, for example, Ti, Cu, Au, Ag, Cr, Pt, Fe, Al, Si, alloys thereof, or oxides thereof. For example, metal oxides such as $TiO_2$, $SiO_2$, and $Al_2O_3$ may be included.

The polymeric material may further include inorganic particles providing hydrophilicity or super-hydrophilicity to further modify hydrophilic surface properties of the polymeric material to super-hydrophilicity. For example, according to an embodiment, the inorganic particle including $TiO_2$, $SiO_2$, and $Al_2O_3$, etc. are further disposed at the end of the protrusion forming the nanopattern, and thus the hydrophilic surface properties of the polymeric material may be further modified to super-hydrophilicity.

According to an embodiment, the polymeric material may have the form of non-woven fabric, woven fabric, or a mesh.

According to an embodiment, the polymeric material may include a porous polymer fiber containing more pores in the polymer fiber.

The polymeric material according to an embodiment includes a polymer fiber, in which a micro-nano composite structure is formed, to have hydrophilic or superhydrophilic surface properties of a contact angle of 20° or less with respect to water in air. Given that a contact angle of 20° or less with respect to pure water in air may be defined as "hydrophilic" and a contact angle of less than 10° may be defined as "super-hydrophilic", the polymeric material may have a hydrophilicity or super-hydrophilicity of a contact angle of 20° or less with respect to water in air. Such hydrophilic polymeric material may pass water and prevent oil from passing through.

Meanwhile, the polymeric material may show oil repellency or super oil repellency in which oil is not absorbed into a porous substrate in water and maintains a spherical bubble shape. Accordingly, the polymeric material may have, for example, a contact angle of 140° or greater with respect to oil in water. This provides an important reason why oil can be stored in water. In particular, In particular, since the polymeric material has an oil contact angle of 160° or greater with respect to bunker C oil having high-viscosity (viscosity of approximately 5000 cSt to 1000 cSt), which causes the most frequent spillage in the ocean, it may be possible to retrieve a variety of oil types, from low viscosity crude oil (1 cSt to 10 cSt) to high-viscosity oil.

According to an embodiment, a device including the polymeric material is provided.

The polymeric material may be used in various fields such as an air purifier, an oil-water separator, a bio device, and a solar device, which require hydrophilicity or oil repellency in water together.

According to an embodiment, the polymeric material has excellent strength and durability to withstand in the ocean or a river having a strong tidal current, and form a hydrophilic or superhydrophilic nanopattern on the surface to selectively pass water, and thus the polymeric material may be applied to an oil-water separator providing an excellent oil-water separation effect.

Hereinafter, a method of manufacturing a polymeric material according to an embodiment will be described.

The method of manufacturing a polymeric material according to an embodiment includes performing atmospheric pressure plasma treatment of a surface of a polymeric material having a polymer fiber or film with concavo-convex grooves along the longitudinal direction without a mask.

The method of manufacturing the polymeric material is not limited to the area or the shape of the polymeric material, and in particular, a micro-nano composite structure may be formed over a large area, and a hydrophilic polymeric material may be manufactured relatively simply in an environmentally friendly manner.

The above-described polymeric material may be manufactured by a single process of performing atmospheric pressure plasma treatment of a surface of a polymeric material having a polymer fiber or film with concavo-convex grooves along the longitudinal direction without a mask.

The polymer fiber or film having a concavo-convex structure along the longitudinal direction may have a concavo-convex structure having a cross section of a positively convex " ⌒\ " shape such as a broadleaf tree.

The material of the polymer fiber or film is as described above.

According to an embodiment, the polymer fiber or film may include at least one of natural fiber, artificial fiber, a combination thereof. Examples of the natural fiber may include cellulose, rayon, cotton, silk, hemp, silk, asbestos fibers, combinations thereof, etc. Examples of the synthetic fiber may include i) regenerated fibers such as rayon, modal, tencel, lyocell, and polynosic; ii) semisynthetic fibers such as acetate and triacetate; iii) synthetic fibers such as polyamides including nylon, nomex, Kevlar, etc., polyolefins including polyethylene, polypropylene, etc., polyesters including polyethylene terephthalate, etc., acryl, poly (meth) acrylate, polyvinyl alcohol (PVA), polyurethane, polyvinyl chloride (PVC), polyvinylidene chloride (PVDC), polystyrene, cellulose; inorganic fibers including glass fiber; or copolymers thereof, but are not limited thereto.

According to an embodiment, the polymer fiber or film may include a hydrophilic polymer. Such hydrophilic polymer may include, for example, at least one selected from the group consisting of cellulose, rayon, cotton, silk, polystyrene (PS), polyethylene terephthalate (PET), polycarbonate (PC), polypropylene (PP), polylactic acid (PLA), polyvinylidene fluoride (PVDF), polytetrafluoroethylene (PTFE), poly(N-isopropylacrylamide) (PNIPAm), poly(2-hydroxyethyl methacrylate) (PHEMA), polyetherimide (PEI), polyvinyl alcohol (PVA), polyethylene (PE), polysilsesquinoxane (PSQ), polyurethane (PU), poly(ethylene glycol) (PEG), poly(methyl methacrylate) (PMMA), and polycaprolactone (PCL).

According to an embodiment, the polymer fiber or film may include natural fibers such as cellulose, rayon, etc. having hydrophilicity. These natural fibers are easily available and have a concavo-convex structure along the longitudinal direction of the fiber, so that a micro-nano composite structure may be readily formed on a surface through atmospheric pressure plasma treatment.

The atmospheric pressure plasma treatment may be performed using, for example, the atmospheric pressure plasma treatment device shown in FIG. 3.

The plasma treatment is performed under atmospheric pressure, for example, the pressure for the plasma treatment may be 760 Torr at atmospheric pressure.

The plasma treatment may be performed using at least one gas selected from $O_2$, $CF_4$, $SF_6$, Ar, $N_2$, and $H_2$. According to an embodiment, the plasma treatment may be performed using Ar as an intermediate gas, and using at least one gas selected from $O_2$, $CF_4$, $SF_6$, $N_2$, and $H_2$ as a reaction gas. For example, the plasma treatment may be performed using Ar as an intermediate gas and $O_2$ gas as a reaction gas.

First, a polymeric material (sample) subjected to plasma treatment is disposed on one electrode, and a distance between a plasma outlet and the polymeric material is adjusted at a certain interval. The distance between the plasma outlet and the polymeric material may range from 0.5 mm to 10 mm, for example from 1 mm to 5 mm. In the above range, the aspect ratio (d/h) of the width (d) to the depth (h) of semi-cylindrical concavo-convex grooves may be obtained to a desired level, thereby realizing a hydrophilic surface.

Power of the atmospheric pressure plasma may range from 100 W to 2,000 W, for example, from 100 W to 300 W. In the above range, a micro-nano composite structure may be formed on the surface of the polymeric material.

The polymeric material subjected to plasma treatment is disposed on one electrode, and then plasma is delivered to the polymeric material through an impedance matching passage.

The plasma may have a width of 10 mm to 50 mm, and the polymeric material is exposed to the plasma for 10 to 500 cycles while being moved at a speed of 1 mm/s to 10 mm/s to perform atmospheric pressure plasma treatment. Alternatively, surface treatment may be performed by exposing the polymeric material to atmospheric pressure plasma for 1 to 30 minutes without moving the polymeric material. When the treatment is performed under the above conditions, the surface of the polymeric material may be plasma-etched to form a micro-nano composite structure of a desired shape.

Plasma treatment may vary the shape of the micro-nano composite structure when controlling its conditions and treatment time.

This atmospheric pressure plasma treatment method is an atmospheric pressure plasma process which is simple and does not require a vacuum, so that the method may allow a polymeric material having a micro-nano composite structure associable with a large area mass production process such as a continuous process and a roll-to-roll process and applicable to a variety of applications.

The polymeric material thus prepared may further improve hydrophilicity or hydrophobicity due to the micro-nano composite structure formed on the surface. In particular, the polymer surface having improved hydrophilicity may have a functional surface having remarkably increased underwater oleophobicity.

Hereinafter, the present disclosure will be described in more detail with reference to the following Examples.

The morphological structures of the surfaces prepared in the following Examples and Comparative Examples were examined using a scanning electron microscopy (SEM, FEI, Nova NanoSEM 200, USA). The contact angle (CA) with respect to water was measured using a contact angle meter (Goniometer, Rame-Hart, USA) The volume of each water drop used for a static contact angle was 8 µl. An average CA value was obtained after measuring at five different locations for the same sample.

EXAMPLE 1

Atmospheric Plasma etching with 13.56 MHz frequency was used, but a cellulose fiber was surface treated as follows.

Atmospheric pressure plasma treatment device (Applasma, MyPL Auto 200) as shown in FIG. 1 was used and the cellulose-based fiber was placed on an electrode (R.f power, water-cooled cathode) in the plasma treatment device. The width of the plasma outlet is 20 mm and the distance between the plasma outlet and the cellulose fiber ranges from 1 mm to 5 mm.

Plasma was delivered to the cellulose-based fiber through an impedance matching passage. At this point, using a mixed gas plasma of Ar gas (5l µm) as a medium gas and $O_2$ gas (30 sccm) as a reaction gas, the cellulose-based fiber was exposed to 50 cycles of plasma having a width of 20 mm while being moved at a speed of 10 mm/s at 760 Torr and a voltage of 250 W.

EXAMPLE 2

The surface treatment was performed in the same manner as in Example 1, except that a cotton fiber was plasma treated instead of the cellulose-based fiber.

EVALUATION EXAMPLE

The SEM image of the surface of the cellulose-based fiber before and after the atmospheric pressure plasma treatment in Example 1 is shown in FIG. 4. As shown in FIG. 4, it is seen that in a cellulose-based fiber having a cross section a cross section of a positively lobed shape such as a broadleaf tree, as the surface exposed to the plasma is etched in a microscale semi-cylindrical (" \_/ ") shape through atmospheric pressure plasma treatment, microscale concavo-convex grooves are formed along the longitudinal direction of the fiber, and a nanopattern having nanoscale protrusions is formed on a surface of the concavo-convex grooves.

It was observed that the cellulose-based fiber obtained after the atmospheric pressure plasma treatment in Example 1, not only has the surface structure of FIG. 4 but also has the wrinkled structure shown in FIG. 15. This may indicate that the surface of the cellulose-based fiber was hardened rapidly by the plasma and the compressive force was applied laterally to form wrinkles.

Meanwhile, in Example 1, a SEM image showing the etching degree of the cellulose-based fiber according to the atmospheric pressure plasma exposure is shown in FIG. 7. As shown in FIG. 7, it is seen that greater exposure to the atmospheric pressure plasma induces etching, and thus a semi-cylindrical (" \_/ ") microstructure and a nanopattern are clearly formed.

Figure 8:
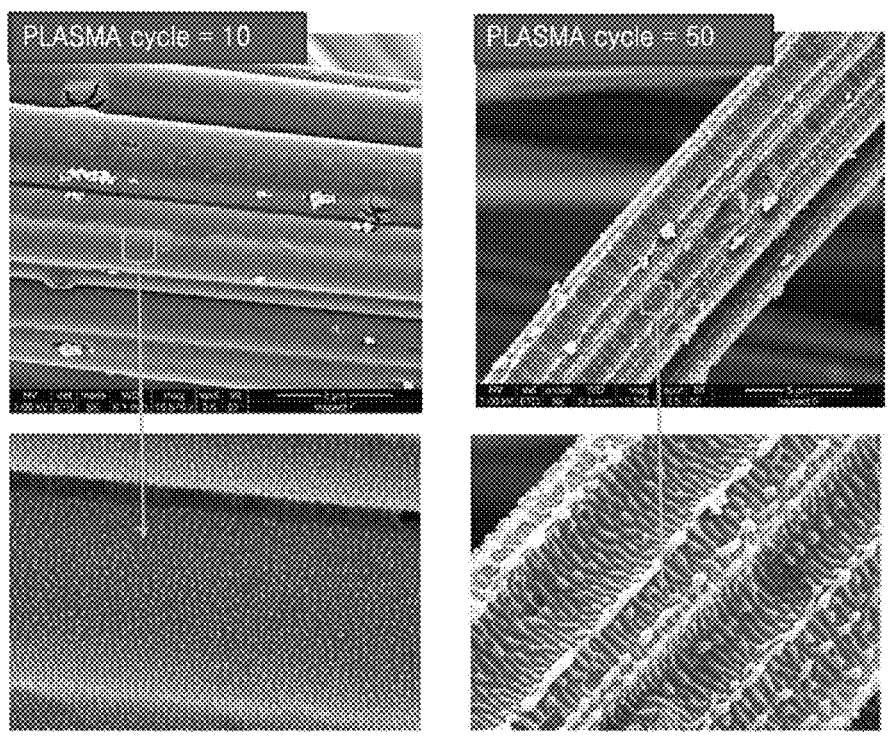
FIG. 8 is a SEM image showing the degree of etching of a polymer fiber according to the number of cycles of atmospheric pressure plasma treatment in Example 1.

In Example 1, SEM images of the surface of the cellulose-based fiber after 10 and 50 cycles of plasma treatment are shown in FIG. 8 for comparison. After 10 cycles of plasma treatment, nanoprotuberances began to be formed on the surface of the fiber, and after 50 cycles, a complete micro-nano composite structure was formed on the surface of the fiber.

Figure 9A:
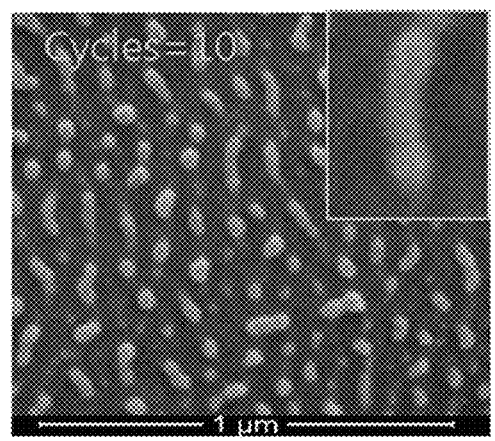
FIGS. 9A to 9C are SEM images showing nano-patterns of surfaces according to the number of cycles of atmospheric pressure plasma treatment in Example 1.
Figure 9B:
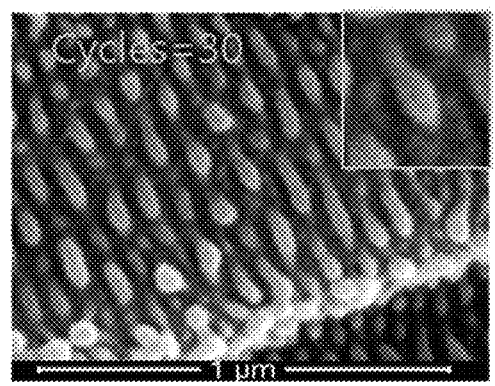
Figure 9C:
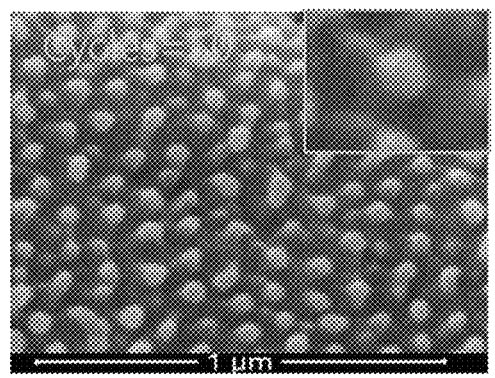

SEM images of enlarged nanopatterns formed on the surface of the cellulose-based fiber after 10, 30 and 50 cycles of plasma treatment in Example 1 are shown in FIGS. 9A to 9C, respectively. As shown in FIGS. 9A to 9C, it is seen that as the plasma treatment is performed, protrusions of a nano-dorm-shape is formed on the surface.

Figure 10:
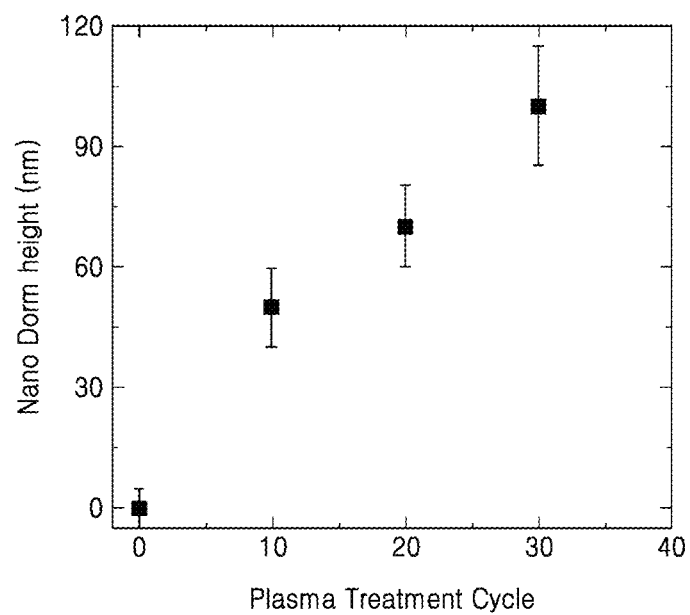
FIG. 10 is a graph showing the size of a nano-dome according to the number of cycles of atmospheric pressure plasma treatment in Example 1.

In addition, the results of measuring the height of the nano-dome for each plasma treatment cycle are shown in FIG. 10. As shown in FIG. 10, it is seen that as the plasma treatment is performed, etching occurs further, so that the height of the nano-dome increases.

Figure 11:
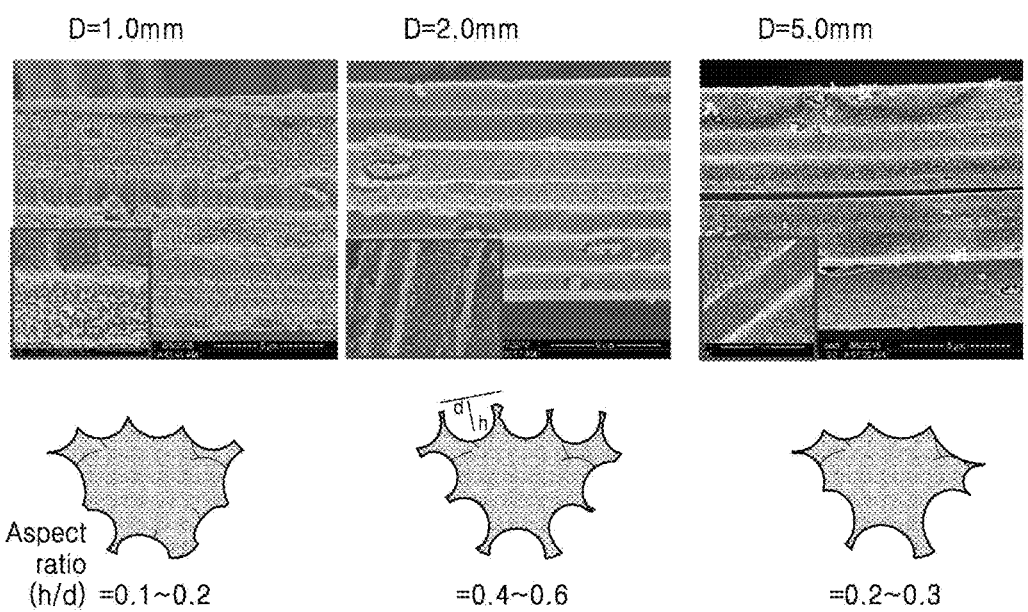
FIG. 11 is a SEM image showing the degree of etching of a polymer fiber according to a distance between a plasma outlet of an atmospheric pressure plasma manufacturing device and a surface of a polymeric material in Example 1, and showing an aspect ratio of an etched groove.

FIG. 11 shows a SEM image and an aspect ratio (d/h) indicating the degree of etching of concavo-convex grooves on the surface of the fiber according to the distance between the plasma outlet and the cellulose-based fiber in Example 1. As shown in FIG. 11, it is seen that in a distance range of 1 mm to 5 mm, the aspect ratio (d/h) may be formed in a range of 0.1 to 0.5.

Figure 12A:
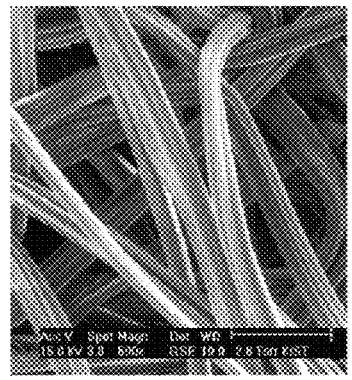
FIGS. 12A to 12C show results of observing water absorbent properties of a polymeric material subjected to atmospheric pressure plasma treatment in Example 1.
Figure 12B:
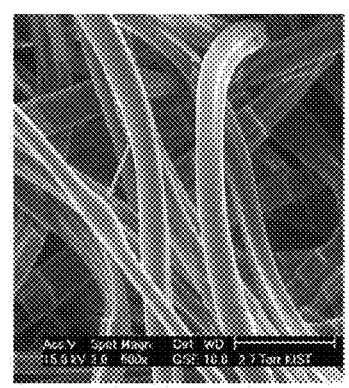
Figure 12C:
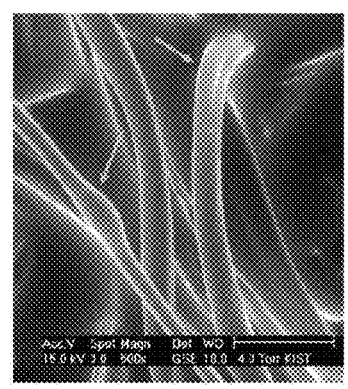

Meanwhile, absorbent properties of the cellulose-based fiber subjected to atmospheric pressure plasma treatment in Example 1 were evaluated while blowing moisture using Environmental SEM (ESEM), and ESEM images are shown in FIGS. 12A to 12C. FIG. 12A is a sample before treatment, FIG. 12B is a surface image after 10 cycles of the plasma treatment, and FIG. 12C is a surface image after 50 cycles of the plasma treatment. As shown in FIGS. 12A to 12C, it is seen that the atmospheric pressure plasma treated cellulose-based fiber has excellent hygroscopicity in proportion to the plasma treatment time.

Figure 13:
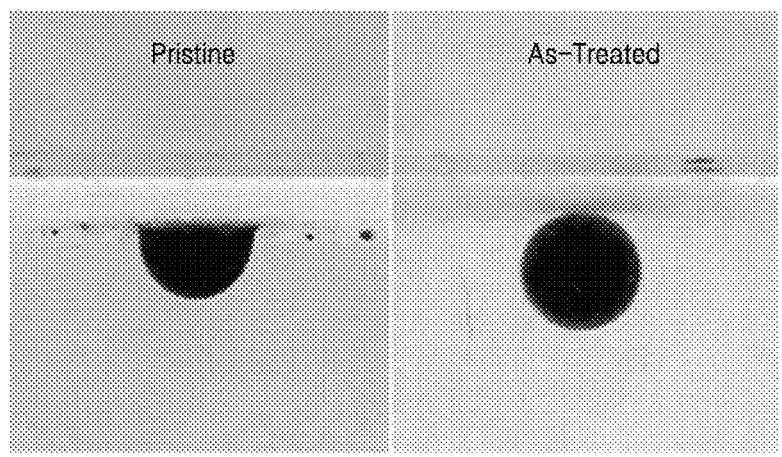
FIG. 13 is a result of observing super-oil repellency properties of a polymeric material before and after atmospheric pressure plasma treatment in Example 1.

FIG. 13 is a comparative image showing the wettability of oil in water of the cellulose-based fiber before and after atmospheric pressure plasma treatment in Example 1. As shown in FIG. 13, the cellulose-based fiber before plasma treatment did not form a water membrane on the surface, so that Bunker C oil was in contact with the surface of the fiber to form a contact angle of about 95°. Meanwhile, the atmospheric pressure plasma-treated cellulose-based fiber has improved hydrophilicity to enhance a binding force between the water membrane and the fiber, and thus the water membrane formed on the surface of the fiber prevents oil from directly contacting the cellulose-based fiber, thereby having super-oleophilic properties of a high oil contact angle of 175°.

Figure 14:
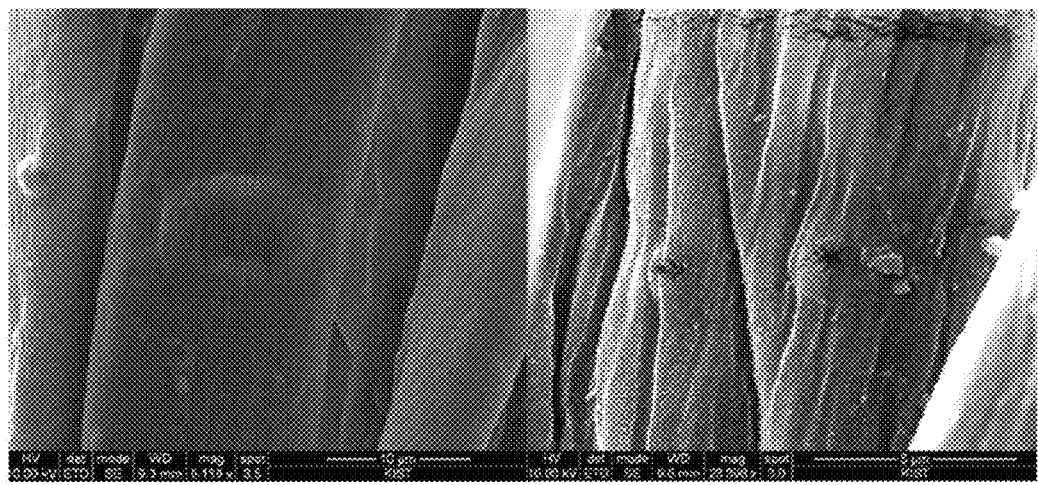
FIG. 14 is a SEM image showing a surface of a polymer fiber before and after atmospheric pressure plasma treatment in Example 2.

FIG. 14 is a SEM image showing the surface of the cotton fiber before and after atmospheric pressure plasma treatment in Example 2. As shown in FIG. 16, in the case of the cotton fiber, after 50 cycles of atmospheric pressure plasma treatment, it is seen that irregularity becomes greater on a surface of the fiber strand, which has similar properties to a viscose rayon fiber.

The polymeric material according to an embodiment has excellent absorbency, hydrophilic or super-hydrophilic surface properties, and oleophobic or super-oleophilic properties in water, and thus may be effectively applied to fields such as oil-water separation, purification, and filters. The polymeric material may be readily manufactured through an environmentally friendly, large-area atmospheric pressure plasma process.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A polymeric material comprising:
a first polymer fiber comprising a micro-nano composite structure, wherein the microstructure consists of a fluted cross-section with semi-elliptical depressions and concavo-convex grooves with the semi-elliptical cross-section and parallel projections between the grooves, the grooves and the parallel projections extending in the same longitudinal direction of the first polymer fiber, and wherein the nanostructure comprises nanoscale protrusions disposed on a surface of the grooves; and
a second polymer fiber formed of the same material as the first polymer fiber, wherein the second polymer fiber consists of a fluted cross-sectional microstructure with semi-elliptical projections, the projections having an outer wrinkled surface, wherein the second polymer fiber is separate and distinct from the first polymer fiber.

2. The polymeric material of claim 1, wherein the first polymer fiber comprises a crystalline region and an amorphous region, and a concave portion of the concavo-convex grooves have a greater amorphous region than a convex portion between the concavo-convex grooves.

3. The polymeric material of claim 1, wherein the concavo-convex grooves each have a width d of 1 nm to 1000 nm, and a depth h of 1 nm to 1000 nm; and/or
wherein an aspect ratio (h/d) of the width d to the depth h of the concavo-convex grooves ranges from 0.01 to 0.6.

4. The polymeric material of claim 1, wherein the nanoscale protrusions have the form of nano-domes, nano-walls, nano-dots, nano-bumps, nano-hairs, nano-fibers, nano-pillars, nano-rods, nano-wires, nano-plates, or a combination thereof.

5. The polymeric material of claim 1, wherein the protrusions have a diameter of 1 nm to 1000 nm, a length of 1 nm to 10,000 nm, and an aspect ratio of 1 to 50.

6. The polymeric material of claim 1, wherein the first and the second polymer fibers comprise at least one of natural fiber, artificial fiber, and a combination thereof.

7. The polymeric material of claim 1, wherein the first and the second polymer fibers comprise a hydrophilic polymer, and
wherein the hydrophilic polymer comprises at least one of cellulose, rayon, cotton, silk, polystyrene (PS), polyethylene terephthalate (PET), polycarbonate (PC), polypropylene (PP), polylactic acid (PLA), polyvinylidene fluoride (PVDF), polytetrafluoroethylene (PTFE), poly(N-isopropylacrylamide) (PNIPAm), poly (2-hydroxyethyl methacrylate) (PHEMA), polyetherimide (PEI), polyvinyl alcohol (PVA), polyethylene (PE), polysilsesquinoxane (PSQ), polyurethane (PU), poly(ethylene glycol) (PEG), poly(methyl methacrylate) (PMMA), and polycaprolactone (PCL).

8. The polymeric material of claim 1, wherein the wrinkled surface of the second fiber has a hierarchical wrinkled structure formed of microscale wrinkles and nanoscale wrinkles.

9. The polymeric material of claim 1, wherein the content of the second polymer fiber is greater than 0% and equal to or less than 50% by weight with respect to the total weight of the polymeric material.

10. The polymeric material of claim 1, further comprising inorganic particles.

11. The polymeric material of claim 1, wherein the polymeric material is a porous polymeric material.

12. The polymeric material of claim 1, wherein the polymeric material has the form of non-woven fabric, woven fabric, or a mesh.

13. The polymeric material of claim 1 comprising a contact angle with respect to water in air is 20° or less; and/or
wherein a contact angle with respect to oil in water is 140° or greater.

14. A device comprising the polymeric material according to claim 1,
wherein the device is an oil-water separator, an air purifier, a bio device, or a solar device.

15. A method of manufacturing the polymeric material of claim 1, the method comprising:
performing, without a mask, atmospheric pressure plasma treatment on a surface of a polymeric material, wherein the concavo-convex grooves and the parallel projections of the first polymer fiber form along the longitudinal direction of the fiber.

16. The method of claim 15, wherein the plasma treatment is performed using at least one of $O_2$, $CF_4$, $SF_6$, Ar, $N_2$, and $H_2$.

17. The method of claim 16, wherein the plasma treatment is performed using Ar as an intermediate gas, and using at least one gas selected from $O_2$, $CF_4$, $SF_6$, $N_2$, and $H_2$ as a reaction gas.

18. The method of claim 15, wherein the atmospheric pressure plasma treatment is performed by exposing the polymeric material to atmospheric pressure plasma for 10 to 500 cycles while moving the polymeric material at a speed of 1 mm/s to 10 mm/s, in a state in which a distance between a plasma outlet and the polymeric material ranges from 1 mm to 10 mm, and power of the atmospheric pressure plasma ranges from 100 W to 2,000 W.

* * * * *